United States Patent [19]

Walker

[11] 4,134,570

[45] Jan. 16, 1979

[54] TWO VOLUME FLUSH VALVE

[76] Inventor: Brooks Walker, 1280 Columbus Ave., San Francisco, Calif. 94133

[21] Appl. No.: 745,461

[22] Filed: Dec. 9, 1976

[51] Int. Cl.² .......................................... F16K 31/145
[52] U.S. Cl. ........................................ 251/40; 251/45; 251/284; 251/285
[58] Field of Search ...................... 251/38, 39, 40, 45, 251/46, 228, 298, 284, 285

[56] References Cited

U.S. PATENT DOCUMENTS

| 1,573,092 | 2/1926 | Russell | 251/40 |
| 1,894,741 | 1/1933 | Hartog | 251/285 |
| 1,912,937 | 6/1933 | George | 251/40 |
| 1,998,155 | 4/1935 | Cadwell et al. | 251/40 |
| 2,066,086 | 12/1936 | Wilson | 251/40 |
| 2,472,576 | 6/1949 | Dobrick | 251/40 |
| 2,612,187 | 9/1952 | Romanelli et al. | 251/40 |
| 2,620,826 | 12/1952 | Johns | 251/40 |
| 2,738,946 | 3/1956 | Filliung | 251/40 |
| 3,194,501 | 7/1965 | Cape | 251/285 |
| 3,207,467 | 9/1965 | Bühler | 251/40 |
| 3,406,940 | 10/1968 | Kertell | 251/40 |

Primary Examiner—Martin P. Schwadron
Assistant Examiner—G. L. Walton
Attorney, Agent, or Firm—Gordon Wood

[57] ABSTRACT

A flush valve of the tilting pilot valve type in which stops are provided for the manually or pedal-actuated handle so as to provide a low volume or a normal volume as desired. In one form an attachment having a low volume stop is provided on the conventional handle housing. In another form the conventional housing is replaced by a modified housing provided with the low volume stop. In still another form an attachment in the form of a clamp is provided on the handle to provide the low volume.

3 Claims, 9 Drawing Figures

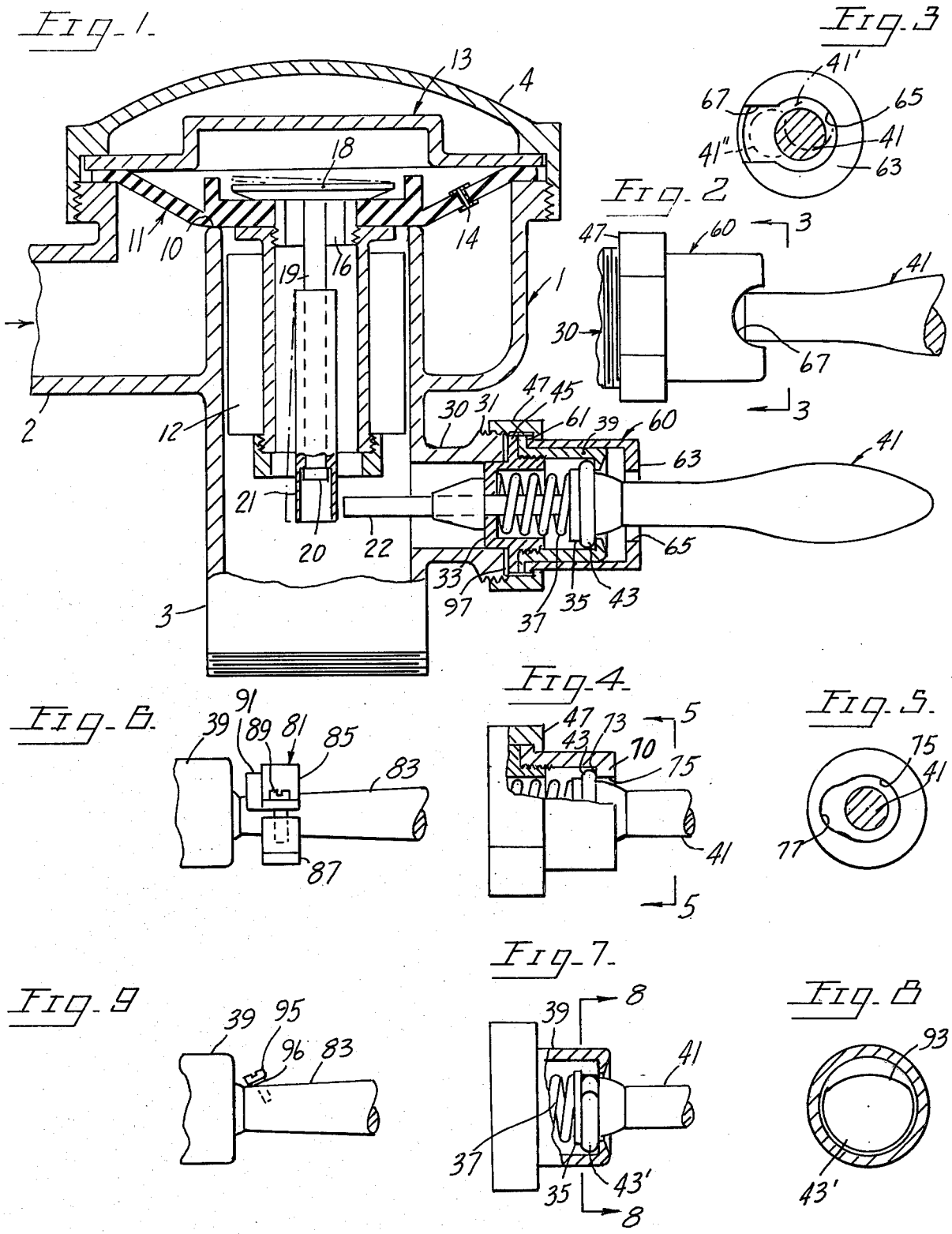

TWO VOLUME FLUSH VALVE

This invention relates to a flush valve for a toilet of the tilting pilot valve type wherein a manual or pedal-actuated handle is adapted to be swung from a normal position so as to tilt the pilot valve which releases pressure in a fluid pressure chamber permitting a diaphragm to move to an open position relative to a seat on the outlet conduit permitting a full volume of water from the inlet of the valve to be discharged to the toilet.

In the past, attempts have been made to modify flush valves of the subject type in order to permit the user to obtain a low volume flush when desired as opposed to the normal higher volume flush (see, for example, U.S. Pat. No. 3,406,940). Such prior art devices have in general been quite complicated and expensive to install so that their adoption has not been as commercially feasible as the instant invention.

The main object of the present invention is the provision of a simple means or kit for obtaining selectively either a low volume or a normal volume of the flushing water thereby effecting a saving in water when a normal volume is not required.

Other objects and advantages will be apparent from the following specification and from the drawings.

FIG. 1 is a vertical sectional view of a conventional flush valve of the tilting pilot type showing one form of the invention attached thereto.

FIG. 2 is a fragmentary side elevational view of the handle housing structure of FIG. 1.

FIG. 3 is a cross sectional view through the handle showing the housing attachment provided with the low volume stop means.

FIG. 4 is a fragmentary view of a housing handle structure showing another form of the invention in which the conventional housing is replaced by one having the required low volume stop means.

FIG. 5 is a cross sectional view through the handle showing the contour of the handle opening in the housing.

FIG. 6 is a view similar to FIG. 4 showing still another form of the invention in which the stop means is secured to the handle.

FIG. 7 is a view similar to FIG. 4 showing another form of the invention.

FIG. 8 is a cross section taken in a plane indicated by lines 8—8 of FIG. 7.

FIG. 9 is a view similar to FIG. 6 showing another form of the invention.

In detail, and first with reference to FIG. 1, the present invention is adapted to be employed on a flush valve of the tilting pilot type which includes a main body portion 1 formed with an inlet 2 and an outlet 3. The valve includes a head 4 which is threadedly secured to the main body 1 as indicated. The outlet 3 continues upwardly through the body 1 and is formed at its upper end to provide a seat 10.

Cooperating with seat 10 to normally close the valve is a diaphragm generally designated 11 and having a guide 12. Diaphragm 11 is clamped to the valve around its periphery as indicated. A recessed washer member 13 is provided above the diaphragm 11 to permit the assembly to be tightly secured when the head 4 is threaded onto the body of the valve.

On the wall of diaphragm 11 is a bleed valve 14 which permits water under pressure from the inlet to enter the chamber above the diaphragm 11, thus keeping the valve normally closed.

The diaphragm 11 is provided with a central opening 16 which is normally closed by a poppet valve having a head 18 and a stem 19. The lower end of stem 19 is provided with an upset portion 20 which is adapted to retain a sleeve 21 on stem 19 and permit upward movement of said sleeve relative to the stem 19 from the position shown in FIG. 1.

Alongside the lower end of sleeve 21 is the outer end of a rod 22 which is actuated in a manner to be described.

It will be noted at this point that when rod 22 is moved to the left as seen in FIG. 1 the effect is to tilt the sleeve 21 to the dot-dash position indicated and along with it the head 18 of the pilot valve. When said head 18 is tilted it will be apparent that the pressure within the chamber above diaphragm 11 causes a sudden outflow of water through the central opening 16 in said diaphragm to the lower pressure outlet 3. Since the pressure beneath the diaphragm 11 becomes greater than the pressure above the diaphragm the latter moves upwardly at its central portion causing the valve to open and provide the flushing water to the toilet.

After an interval of time determined by the diameter of the bleed valve 14 the pressure again builds up in the chamber above diaphragm 11 to close off the outlet 3.

At this point it will be apparent that the amount of flushing water discharged by the valve is directly proportional to the angle of tilt which is obtained by movement of the rod 22. In other words, if the pilot valve structure is tilted through a large angle a relatively great amount of water will be released from the chamber above diaphragm 11 whereas a smaller angle of tilt will reduce the amount discharged and will therefore reduce the time taken to build up the pressure in the upper chamber by the flow of water through bleed valve 14. The manner in which different intervals of time are obtained by providing different angles of tilt of the pilot valve will now be described.

The conventional flush valve of the subject type also includes a lateral tubular extension 30 provided with external threads 31. Fitted within the end of extension 30 is a base 33 which is centrally apertured to receive rod 22 therethrough. Said rod 22 is provided at its inner end with an integral head 35 which is urged to the right as seen in FIG. 1 by means of a compression spring 37.

Threadedly secured to base 33 is a tubular housing 39 which is provided with a central aperture through which extends a handle generally designated 41. This handle 41 is provided at its inner end with an annular portion 43 which abuts the outer end of housing 39 and is urged against said outer end by the spring urged head 35 of rod 22. In the conventional valve the housing 39 is provided with an annular flange 45 which cooperates with a nut for threadedly securing the structure to the threads 31 of extension 30.

At this point it will be noted that in the conventional valve a swinging movement of handle 41 from its normal horizontal position in any direction has the effect of urging rod 22 into engagement with the lower end of sleeve 21 thereby opening the poppet valve 18 to cause the flushing action.

By the present invention the above described structure is modified by providing a sleeve generally designated 60 over the housing 39. Said sleeve is provided with an annular flange 61 similar to flange 45 of housing 39 to permit said added sleeve 60 to be fixedly secured relative to the valve body by a modified nut 47. The sleeve 60 is provided with a radially inwardly projecting flange 63 providing a central opening 65 through which the handle 41 projects. The flange 63 is interrupted to provide a radially extending slot 67 (FIG. 3) which is sufficiently wide to permit the handle 41 to be received therein. Referring to FIG. 3. it will be seen that the flange 65 limits the swinging movement of handle 41 and provides a stop for such handle preventing the latter from being swung any more than to the position indicated by dot-dash lines 41'. However, if it is desired to swing the handle 41 through a greater arc this can be done by swinging said handle into the slot 67 to a position such as indicated by dotted lines 41" in FIG. 3. It will be noted that in the above described form of the invention the added sleeve 60 and the existing housing 39 in effect constitute a new housing in which a stop is provided for limiting the swing of handle 41. By the above described structure a short flush may be achieved by swinging the handle 41 against the flange 65 thereby providing a smaller than normal tilt to valve 18 thus reducing the length of time during which the main valve is open. When the handle 41 is swung into slot 67 a normal flush may be obtained since the larger angle of tilt of valve 18 corresponds to such normal flush.

Another form of the invention is shown in FIGS. 4, 5 wherein the conventional housing 39 is discarded and a new housing 70 is provided and which may be secured in any desired position by a nut 47 as above described. In this case the housing 70 is formed with a shoulder 73 against which the flange 43 of handle 41 abuts. This housing 70 is also provided with a central aperture 75 (FIG. 5) for receiving handle 41 therethrough and which aperture is enlarged at a point in its periphery as indicated at 77 in FIG. 5. The sidewall of aperture 75 acts as a stop for handle 41 to limit the swing of said handle so as to provide a short flush while the enlargement 77 permits the handle 41 to be swung its normal amount corresponding to a normal flush.

Another form of the invention is shown in FIG. 6 wherein a collar generally designated 81 is secured to the handle 83 projecting from the conventional housing 39. The collar 81 comprises upper and lower clamping elements 85, 87 which are complementarily formed relative to the tapered handle 83 and which elements are clamped together by a pair of screws 89. The upper clamping element 85 is formed with an integral lateral projection 91 which acts as a stop engaging the outer end of housing 39 when the handle 83 is swung upwardly as seen in FIG. 6. However, when the handle is swung downwardly no such stop exists and a normal swing of handle 83 may be effected to provide the normal flush. Collar 81 may be adjustably positioned along the handle 83 as required.

Another form of the invention is shown in FIGS. 7, 8 wherein the flange 43' on the inner end of handle 41 is cut away as indicated at 93 in FIG. 8 so as to reduce the axial movement of disk 35 when the handle 41 is swung downwardly. It will be apparent that when the handle 41 is swung downwardly a reduced amount of travel of disk 35 will result so as to give the reduced flush as the normal heel about which the handle 41 normally swings has been removed. When handle 41 is swung upwardly a normal travel of disk 35 is obtained to provide a normal flush.

Another form of the invention is shown in FIG. 9 wherein the handle 83 which cooperates with housing 39 is tapped so as to permit a screw 95 to be threadedly secured to said handle as indicated. By providing one or more washers 96 under the head of screw 95 it will be apparent that the amount of upward swing of handle 83 may be limited by said screw so as to provide the desired short flush.

Referring back to FIG. 1 the spacing between the free end of rod 22 and the sleeve 21 in all forms of the invention may be accurately adjusted as desired by providing one or more washers 97 between the flange 45 of base 33 and the outer end of extension 30.

I claim:

1. In a flush valve of the tilting pilot valve type in which a flow controlling diaphragm opens the discharge conduit in response to tilting of the pilot valve and its attached stem by engagement of said stem by a unitary rod translated by swinging movement of an actuating handle from a normal position; the improvement that comprises:
   a housing secured to said valve and receiving the inner end of said actuating handle therein,
   said housing comprising a tubular member fixedly secured to said valve and formed with an outer wall through which said handle projects,
   said outer end wall being formed with an opening having a reduced radial extent relative to said handle in one direction and an enlarged radial extent in another direction, whereby
   the permitted angle of swing of said handle is dependent on the direction in which it is swung.

2. In a flush valve of the tilting pilot valve type in which a flow controlling diaphragm opens the discharge conduit in response to tilting of the pilot valve and its attached stem by engagement of said stem by a unitary rod translated by swinging movement of an actuating handle from a normal position; the improvement that comprises:
   a housing secured to said valve and receiving the inner end of said actuating handle therein,
   means cooperating between said handle and said housing for reducing the permitted angle of swing of said handle in one direction from said normal position and permitting a larger angle of swing in another direction from said normal position,
   said handle being formed at its inner end to provide pivot points of different distances from the central axis of said handle for providing different amounts of movement of said rod depending on the direction said handle is swung.

3. In a flush valve of the tilting pilot valve type in which a flow controlling diaphragm opens the discharge conduit in response to tilting of the pilot valve and its attached stem by engagement of said stem by a unitary rod translated by swinging movement of an actuating handle from a normal position; the improvement that comprises:
   a housing secured to said valve and receiving the inner end of said actuating handle therein,
   means cooperating between said handle and said housing for reducing the permitted angle of swing of said handle in one direction from said normal position and permitting a larger angle of swing in another direction from said normal position,
   said means including a retainer member fixedly secured to said valve and receiving the inner end of said handle, and a sleeve surrounding said retainer and formed with stops for engaging said handle.

* * * * *